(12) United States Patent
Saksena

(10) Patent No.: US 6,235,210 B1
(45) Date of Patent: May 22, 2001

(54) COMBINATION CONTINUOUS AND BATCH FILTER FOR A RECIRCULATING FRYER

(75) Inventor: Atul Saksena, Troy, OH (US)

(73) Assignee: Hobart Corporation, Troy, OH (US)

( * ) Notice: Subject to any disclaimer, the term of this patent is extended or adjusted under 35 U.S.C. 154(b) by 0 days.

(21) Appl. No.: 09/513,736

(22) Filed: Feb. 22, 2000

(51) Int. Cl.[7] .............................. B01D 37/00; A47J 37/12
(52) U.S. Cl. ........................ 210/791; 210/805; 210/167; 210/196; 210/411; 210/416.1; 210/424; 210/428; 210/DIG. 8; 99/330; 99/403; 99/408
(58) Field of Search ................................ 201/DIG. 8, 167, 201/791, 805, 196, 411, 416.1, 424, 428; 99/330, 403, 408

(56) References Cited

U.S. PATENT DOCUMENTS

| | | | |
|---|---|---|---|
| 2,578,129 | 12/1951 | Daugherty | 99/403 |
| 3,608,472 | 9/1971 | Pelster et al. | 99/327 |
| 3,685,433 | 8/1972 | Cunningham | 99/408 |
| 3,797,378 | 3/1974 | Morris | 99/408 |
| 4,084,492 | 4/1978 | Sullivan | 99/330 |
| 4,487,691 | 12/1984 | Panora | 210/167 |
| 4,591,434 | 5/1986 | Prudhomme | 210/117 |
| 4,607,857 | 8/1986 | LeSage et al. | 280/47.26 |
| 4,623,544 | 11/1986 | Highnote | 426/233 |
| 4,747,944 | 5/1988 | George | 210/167 |
| 4,890,548 | 1/1990 | Grob et al. | 99/408 |
| 4,899,649 | 2/1990 | Grob et al. | 99/408 |
| 4,945,893 | 8/1990 | Manchester | 126/391 |
| 5,247,876 | 9/1993 | Wilson et al. | 99/408 |
| 5,253,566 | 10/1993 | McCabe et al. | 99/403 |
| 5,404,799 | 4/1995 | Bivens | 99/408 |
| 5,449,469 | 9/1995 | Burklund et al. | 210/798 |
| 5,597,601 | 1/1997 | Griffin | 426/417 |
| 5,680,811 | 10/1997 | Highnote et al. | 99/408 |

Primary Examiner—Robert J. Popovics
(74) Attorney, Agent, or Firm—Thompson Hine & Flory LLP

(57) ABSTRACT

The present invention provides a combination continuous and batch filtration system for a recirculating fryer where the continuous filter and batch filter assemblies are integrated into a single unit, utilizing a common pump. This unit is substantially compact and is therefore able to fit within the frame of most recirculating fryers. The outlets of the continuous filter and the batch filter are connected to a two-way valve, which is, in turn, connected to the inlet of the common pump. The valve allows an operator to selectively pump cooking fluid from either the continuous filter or the batch filter back into the fryer vat.

13 Claims, 5 Drawing Sheets

COMBINATION CONTINUOUS AND BATCH FILTER FOR A RECIRCULATING FRYER

BACKGROUND

The present invention pertains to a recirculating deep-fat fryer used for cooking various types of food products within a heated bath of cooking oil; and more particularly, to a recirculating deep-fat fryer having a combination continuous and batch filtration system.

A typical recirculating deep-fat fryer will include a fryer vat containing a heating bath of cooking oil. The cooking oil is adapted to receive baskets of food products such that the food products will be immersed within and cooked by the heated cooking oil. Such recirculating fryers will also include a heat exchanger and a pump. The pump is responsible for continuously pumping the cooking oil from the fryer vat, through the heat exchanger and back into the fryer vat such that the cooking oil remains at a substantially constant temperature, thereby allowing the food products to be evenly and consistently cooked within the fryer vat.

To extend the useful life of the cooking oil, it is a common practice to filter the particulate food matter from the cooking oil to minimize the carbonization of such food matter within the cooking oil. Some conventional fryers utilize a batch filtration system, in which the cooking oil is drained from the fryer vat and then manually or mechanically filtered before returning the cleansed cooking oil back to the fryer vat. Other conventional recirculating fryers utilize a continuous filtration system, in which a continuous filter is placed within the fluid path of the cooking oil, so as to continuously filter the cooking oil as being recirculated between the fryer vat and the pump.

Even with such continuous filtration recirculating fryers, there is often a need to perform the batch filtration process on the cooking oil at the end of a predetermined period of time, if a more thorough filtration of the cooking oil is desired. Alternatively, the cooking oil in such continuous filtering recirculating flyers must periodically drained from the fryer vat so that the fryer vat may be cleaned out. Once cleaned, it is often desirable to return this drained cooking oil back to the fryer vat.

Accordingly, with either of such conventional systems, it is often necessary to provide extra floor space for a separate batch filtration system that is typically wheeled from fryer to fryer, performing the batch filtration operation. A disadvantage with such batch filtration systems is that during use, they will need to be positioned to the side or the front of the fryer vat, taking up aisle space and work space within the kitchen.

SUMMARY OF THE INVENTION

The present invention provides a combination continuous and batch filtration system for a recirculating fryer where the continuous filter and batch filter assemblies are integrated into a single unit, utilizing a common pump. This unit is substantially compact and is therefore able to fit within the frame of most recirculating fryers. The outlets of the continuous filter and the batch filter are connected to a two-way valve, which is, in turn, connected to the inlet of the common pump. The valve allows an operator to selectively pump cooking fluid from either the continuous filter or the batch filter back into the fryer vat.

The continuous filter assembly includes of a box-like enclosure with an inlet and an outlet and a filter disposed between the inlet and outlet. During normal operation, the continuous filter assembly is preferably seated within the batch filter assembly and is sized to hold only a portion of the entire fryer vat cooking fluid volume at any given time. The present invention therefore provides a continuous filtration system that increases the efficiency of a recirculating fryer as less cooking fluid is required during normal operation and heat loss is minimized.

The batch filter assembly includes another box-like enclosure or "holding tank", open at the top to allow the continuous filter assembly to fit inside of it. The continuous filter assembly is supported inside the batch filter holding tank by brackets, or other supports, fixed to the inside walls thereof. A filter element for the batch filter assembly is situated in the flow path of cooking fluid through the batch filter. The batch filter holding tank is substantially larger than the continuous filter assembly and is capable of holding the entire cooking fluid volume of the fryer vat.

During normal operation of the recirculating fryer, the continuous filter assembly is seated within the batch filter assembly holding tank and the valve is engaged to allow pumping of cooking fluid from the fryer vat, through the continuous filter, through the valve, through the common pump and back into the fryer vat. At the end of a period of use for the recirculating fryer in continuous filter mode, such as the end of a day, the operator may desire to run a batch filter operation where the entire contents of the fryer vat are filtered while the fryer is not being used to cook food. The operator may then turn off the pump and engage the valve to discontinue flow through the continuous filter assembly. The continuous filter assembly is then removed from its position within the batch filter assembly holding tank and the entire contents of the fryer vat are allowed to be emptied into the holding tank. The operator engages the valve to allow pumping of fluid from the outlet of the batch filter and turns on the pump, thereby pumping fluid from the batch filter holding tank, through the batch filter element, and back into the fryer vat.

Preferably, removal of the continuous filter assembly is facilitated by having the outlet of the continuous filter assembly connected to the inlet of the flow selection valve via a quick-disconnect fitting. It is also preferred that the batch filter assembly have wheels fixed to the base of the holding tank allowing the entire unit to be moved away from within the frame of the recirculating fryer.

The filter element of the continuous filter assembly is preferably comprised of a perforated filter media encapsulated by a nylon bag. This allows larger food particles from the used cooking fluid to be captured on the outside of the bag. Periodically during operation of the filter assembly in continuous filter mode, the pump is activated, either manually or automatically, to reverse flow thereby dislodging food particles from the nylon bag and extending the operating time of the filter assembly. The filter element of the batch filter assembly is preferably comprised of a removable screen that is placed at the bottom of the batch filter holding tank just above the outlet.

In another aspect of the present invention, a recirculating fryer assembly includes a fryer vat for holding cooking fluid and receiving food for cooking, an inlet and an outlet port, a heating element within the fryer vat or within a recirculating path of the cooking fluid, a frame for supporting the flyer vat, and a filtration system having a continuous filter assembly and a batch filter assembly integrated into a single unit and sharing a common pump for pumping fluid from the fryer vat through either the continuous filter assembly or the batch filter assembly and back into the fryer vat.

In yet another aspect of the present invention, a method for filtering the cooking fluid of a recirculating fryer, which has a fryer vat and a pump for recirculating cooking fluid, includes the steps of: (a) providing a continuous filter, a batch filter, and a valve with a first inlet connected to the outlet of the continuous filter, and a second inlet connected to the outlet of the batch filter, and an outlet connected to the inlet of the fryer assembly pump; (b) coupling the inlet of the continuous filter to the outlet of the fryer vat; (c) switching the valve to allow cooking fluid to flow from the continuous filter assembly through the valve and pump; (d) activating the pump so that cooking fluid is pumped from the fryer vat, through the continuous filter, through the valve, through the pump and back into the fryer vat; (e) at the end of a period of running the fryer in continuous filter mode, shutting off the pump; (f) switching the valve to allow flow from the batch filter assembly through the valve and pump; (g) decoupling the continuous filter from the outlet of the fryer vat; (h) removing the continuous filter assembly from its position within the batch filter assembly; (i) draining the cooking fluid from the fryer vat into the holding tank of the batch filter; and (j) activating the pump to pump cooking fluid from the batch filter through the valve, through the pump and back into the fryer vat.

Accordingly, it is an object of the present invention to provide a filtration system for a recirculating fryer assembly where the continuous filter assembly and the batch filter assembly comprise a single unit. It is another object of the present invention to provide a continuous filter assembly that holds substantially less than the entire volume of cooking fluid of a recirculating fryer so that efficiency of the fryer is increased during normal operation. It is a further object of the present invention to provide a filtration system for a recirculating fryer where the continuous filter assembly is removably seated within the batch filter assembly. These and other objects and advantages of the present invention will be apparent from the following description, the appended claims and the attached drawings.

DETAILED DESCRIPTION OF THE INVENTION

It is to be understood that the following dimensions disclosed with respect to the invention are exemplary and pertain to the preferred embodiment of the invention as it exists as of the date of filing; and that such dimensions are not necessarily for use with a commercial embodiment of the invention, if and when such commercial embodiment is developed.

Figure 1:
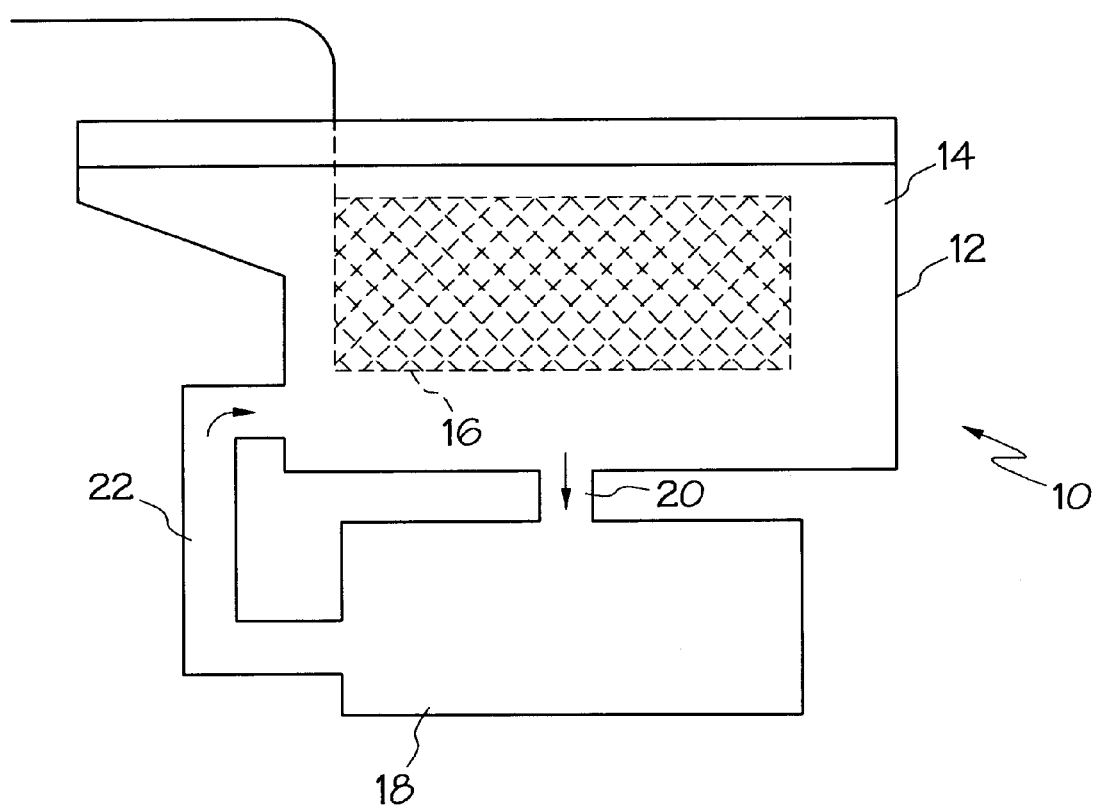
FIG. 1 is a schematic drawing of a fryer assembly for use with the present invention.

As shown in FIG. 1 a recirculating fryer assembly 10 has a fryer vat 12 containing a cooking fluid 14 and accommodating a food basket 16 for cooking food items. A pump and filter assembly 18, in accordance with the present invention, is in fluid communication with the fryer vat 12 via a conduit 20. A conduit 22 serves to return the filtered cooking fluid to the fryer vat 12. This continuous flow of cooking fluid into the fryer vat helps to evenly and efficiently cook the food items contained in the food baskets. Preferably, the cooking fluid is dispersed within the fryer vat 12 using jets (not shown). The jets help keep the free food particles in the cooking fluid afloat in the fryer vat, which helps the food particles to enter into the pump and filter assembly 18 during operation of the fryer assembly 10. In turn, the jets also assist in keeping the floor of the fryer vat clean.

Figure 2:
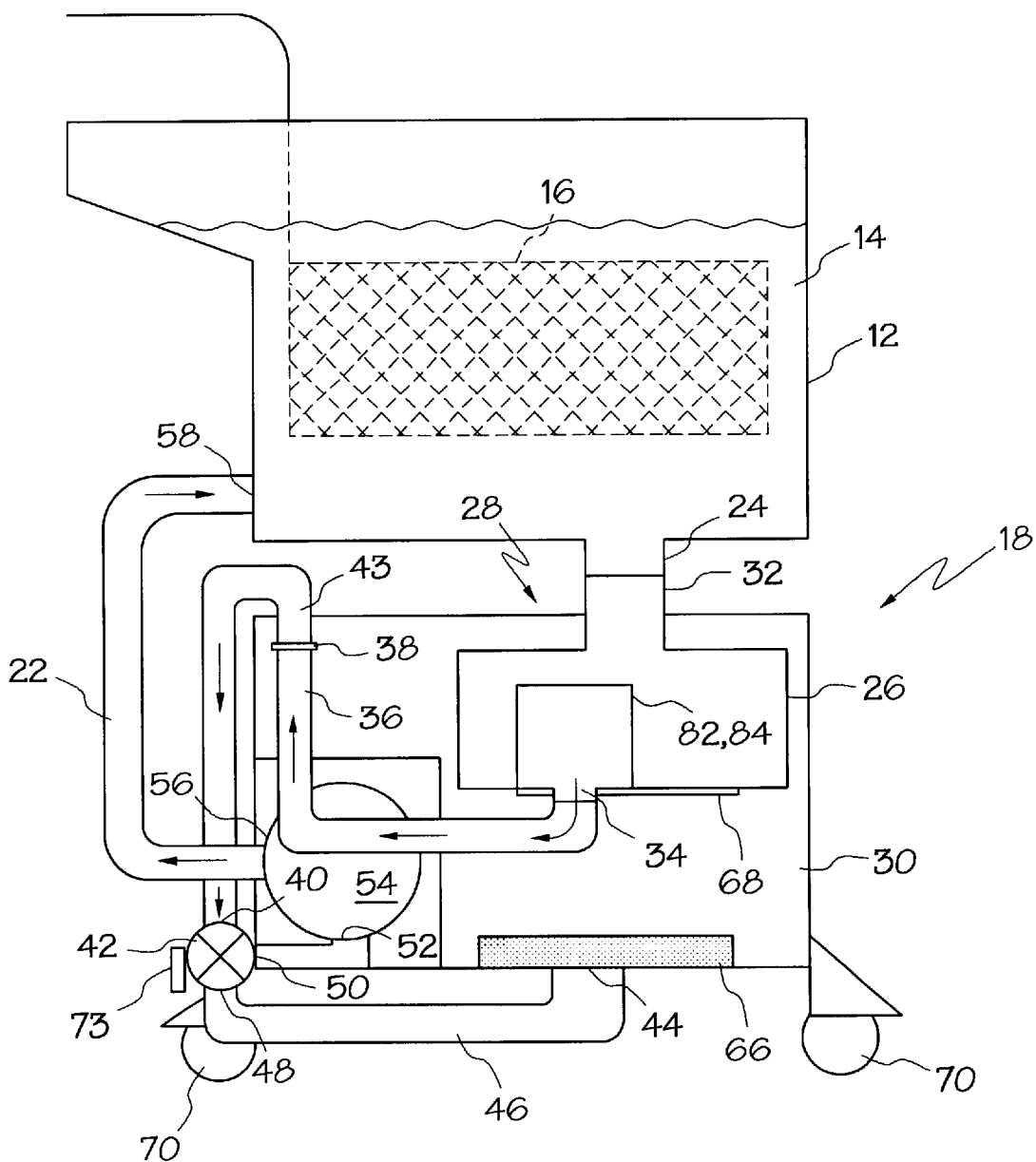
FIG. 2 is a schematic, side view of a fryer assembly and an embodiment of the combination continuous and batch filtration system according to the present invention and illustrating the flow of cooking fluid through the continuous filter assembly during normal operation of the fryer.

A schematic diagram of the pump and filter assembly 18 in accordance with a preferred embodiment of the present invention is shown in FIG. 2. The fryer vat 12 containing cooking fluid 14 has an outlet port 24 connected to the pump and filter assembly 18. The pump and filter assembly includes a continuous filter assembly 26 positioned within an opening 28 of a batch filter assembly 30. The continuous filter assembly 26 has an inlet port 32 connected to the outlet port 24 of the fryer vat 12. The outlet port 34 of the continuous filter assembly 26 is connected, via a conduit 36 and a quick disconnect fitting 38, to a first inlet port 40 of a valve 42 via flexible conduit 43. The outlet port 44 of the batch filter assembly 30 is connected, via a conduit 46, to a second inlet port 48 of the valve 42. The outlet port 50 of the valve 42 is connected to an inlet port 52 of a pump 54. The outlet 56 of the pump 54 is connected, via conduit 22, to an inlet port 58 of the fryer vat 12.

Figure 3:
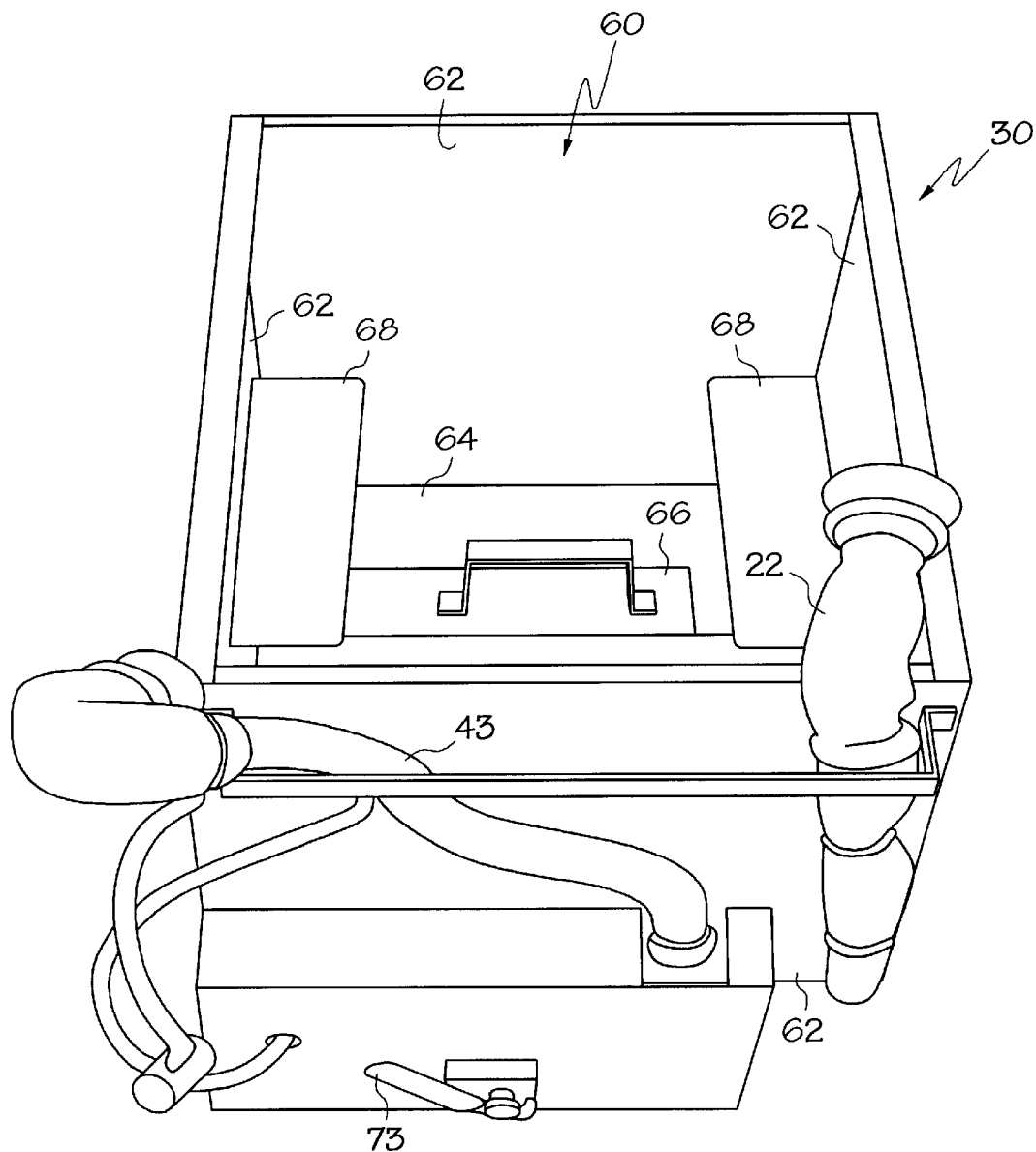
FIG. 3 is a perspective view of an embodiment of the batch filter assembly of the present invention.

As shown in FIGS. 2 and 3, the batch filter assembly 30 includes a holding tank 60, with four vertical side walls 62 and a horizontal bottom wall 64 attached at the edges to form an enclosure with an open top. Preferably, the batch filter holding tank 60 may contain the entire cooking fluid content of the fryer vat 12; and in the preferred embodiment is 18.5"×15.5"×15". A mesh or screen filter 66 is removably attached to the bottom wall 64 of the holding tank 60 and is situated approximately in the center of the bottom wall 64. The filter 66 is placed directly over the outlet port 44 of the batch filter assembly 30. At least two angle brackets 68 are rigidly attached to the side walls 62 of the batch filter holding tank 60 for seating the continuous filter assembly 26 during normal operation of the recirculating fryer 10. A plurality of wheels 70 are attached to the batch filter holding tank 60 near the base to provide mobility for the batch filter assembly 30. The valve 42 is preferably a ball valve and has a handle 73 for switching the valve to either of two positions: a first position providing fluid communication between the first inlet port 40 and the outlet port 50 of the valve, and a second position providing fluid communication between the second inlet port 48 and the outlet port 50 of the valve. It is also within the scope of the invention to have additional positions for the valve, such as a third position that restricts any fluid from flowing therethrough.

Figure 4:
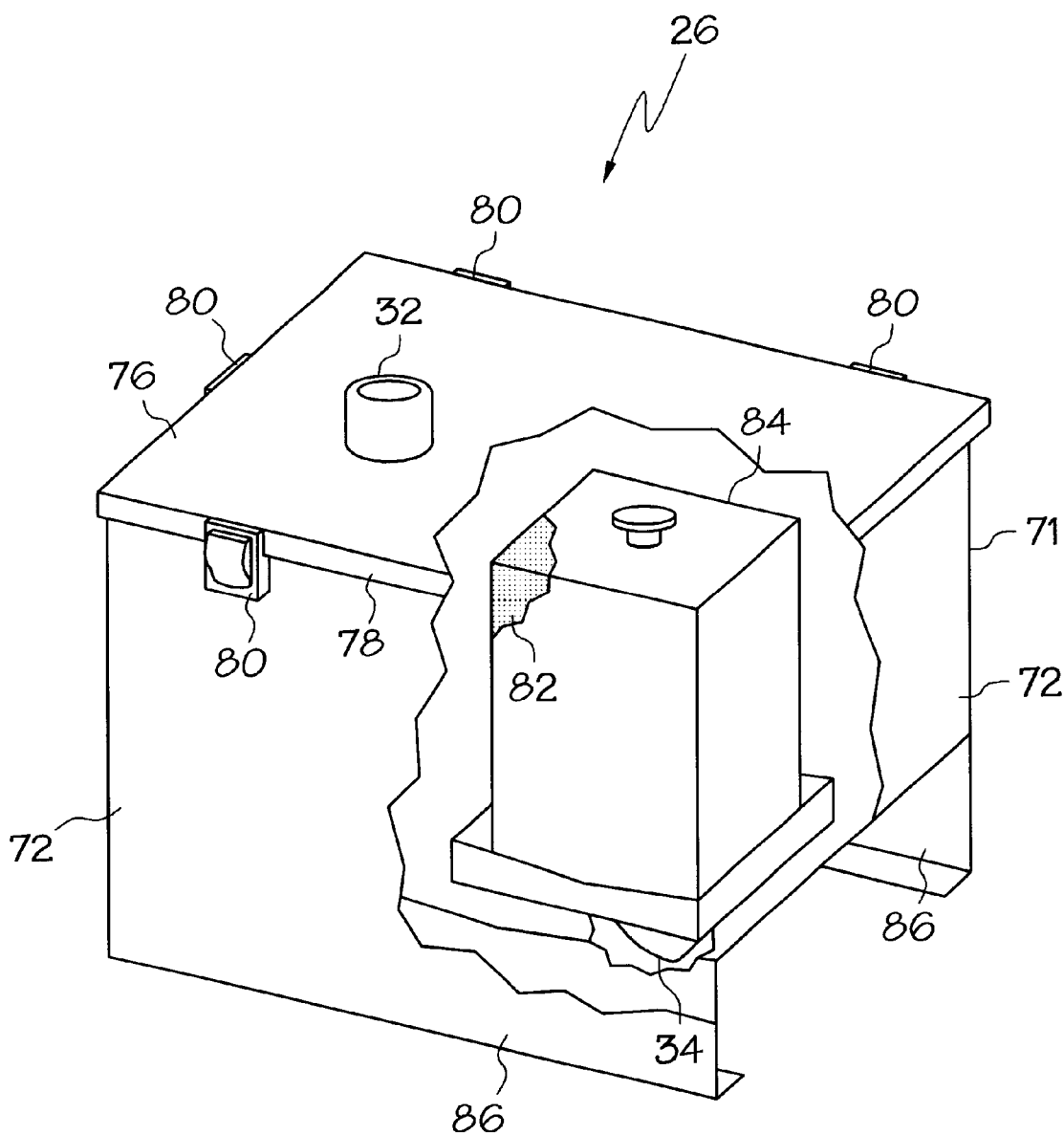
FIG. 4 is a perspective view of an embodiment of the continuous filter assembly of the present invention, with sections removed to show detail.

As shown in FIGS. 2 and 4, the continuous filter assembly 26 includes a housing 71 made up of four vertical side walls 72 and a bottom wall 74, joined at the edges to form an enclosure, and a lid 76. The bottom wall 74 is preferably sloped downwards and inwards towards the outlet port 34. The lid 76 fits over the opening in the top of the continuous filter housing and has a rolled edge 78 to provide a locational fit. The lid 76 may be clamped to the walls 72 of the continuous filter housing 71 with fastening hardware 80. The inlet port 32 of the continuous filter assembly 32 is located approximately in the center of the continuous filter assembly lid 76. The filter element for the continuous filter assembly includes a perforated filter media 82 surrounded by a nylon bag 84 and is fixed on the bottom wall 74 of the continuous filter assembly 26 between the inlet port 32 and the outlet port 34. At least two support legs 86 are attached to the bottom wall 74 of the continuous filter assembly 26 for supporting the assembly either on the brackets 68 within the batch filter holding tank 60 or while free standing once removed from the batch filter holding tank 60. In the preferred embodiment, the overall size of the continuous filter housing 71 is 11"×13"×8.25" while the perforated filter 82 is 5"×5"×6".

Figure 5:
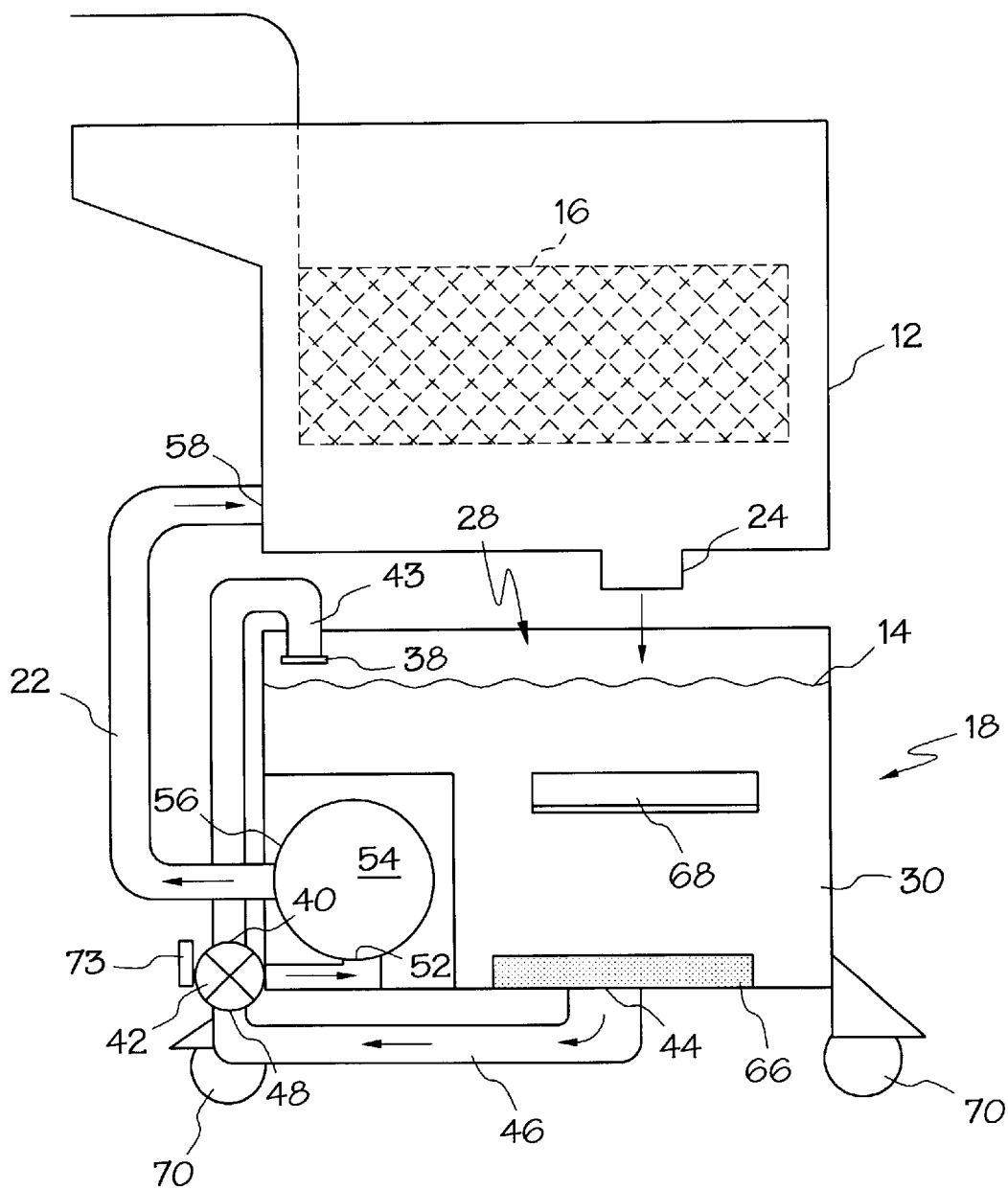
FIG. 5 is a schematic view of the fryer assembly of FIG. 2 with the continuous filter removed and illustrating the flow of cooking fluid from the batch filter assembly during a batch filter operation of the fryer.

FIGS. 2 and 5 illustrate the operation of the combination continuous and batch filter of the present invention. Referring to FIG. 2, during normal operation of the recirculating fryer, the continuous filter 26 is positioned within the housing 60 of the batch filter assembly 30 and is supported within the batch filter assembly 30 by the angle brackets 68. The outlet port 34 of the continuous filter assembly 26 is coupled to the inlet 40 of the selection valve 42 by a quick disconnect fitting 38 and conduits 36, 43. The selection valve 42 is switched to the first position, providing fluid communication between the first inlet port 40 of the valve and the outlet port 50 of the valve, so that cooking fluid received from the outlet port 34 of the continuous filter assembly 26 flows through the valve and into the pump. Therefore, while the fryer is in use, the pump 54 is activated to pump cooking fluid 14 from outlet port 24 of the fryer vat 12, into the continuous filter assembly 26 through the filter 82, through the outlet port of the 34 of the continuous filter assembly 26, through the conduit 36, through the inlet 40 of the selection valve 42, through the outlet of the selection valve 50, through the inlet 52 of the pump 54, through the outlet 56 of the pump 54, through the conduit 22 and back into the fryer vat 12, through the inlet 58. Periodically (preferably, every 3–5 minutes), the pump 54 is activated (either automatically or manually) to temporarily reverse flow so that fluid is pumped back through the conduit 36, through the outlet 34 of the continuous filter 26 and back into the continuous filter, thereby loosening particles from the outside of the continuous filter element 82, so that such particles settle to the floor of the continuous filter housing. It is also noted that if any leakage occurs from the continuous filter during normal operation, such leakage will end up in the holding tank 60 of the batch filter and not on the ground.

Referring to FIG. 5, after a period of operation in the continuous filter mode, it may be desired to filter the entire contents of the fryer vat 12 in a batch filtration operation. At this point, pump 54 is de-energized and the continuous filter assembly 26 is uncoupled from the inlet 40 to the selection valve 42 by disengaging the quick-disconnect fitting 38. The continuous filter assembly 26 may then be removed from the holding tank 60 of the batch filter assembly 30. The entire cooking fluid volume 14 of the fryer vat 12 is then allowed to drain through the outlet port 24 into the holding tank 60 of the batch filter assembly 30. After draining the contents into the batch filter holding tank 60, the outlet port 24 of the fryer vat 12 is plugged. Selection valve 42 is then switched to the second position, providing fluid communication between the second inlet port 48 and the outlet port 50 of the valve. Thereafter, pump 54 is activated to pump the cooking fluid 14 from the batch filter assembly holding tank 60 through the filter 66, through the outlet to the 44 of the batch filter assembly 30, through conduit 46, into the second inlet 48 of the selection valve 42, out of the selection valve outlet 50, into the inlet 52 of the pump 54, out through the outlet 56 of the pump 54, through the conduit 22 and back into the fryer vat 12 through the inlet port 58.

The wheels 70 allow the unitary pump and filter assembly 18 to be rolled away from the fryer vat 12. Accordingly, it is within the scope of the invention that the above batch filtration process may be performed to pump the filtered cooking fluid to a separate article or container, rather than back into the fryer vat 12. The wheels will facilitate easy transportation of the pump and filter assembly 18 to this alternate article or container. The holding tank 60 of the batch filter is also useful for holding the cooking fluids while the fryer vat 12 is being cleaned. The wheels 70 allow the holding tank 60 to be rolled away from the fryer vat 12, facilitating drainage of the cleaning fluids from the fryer vat 12 to a separate container or drain. While it is preferred that the cooking fluid be returned to the fryer vat 12 using the pump 54, after cleaning, it is within the scope of the invention to use a wash down hose.

Having described the invention in detail and with reference to the drawings, it will be apparent to those of ordinary skill in the art that changes can be made to the embodiments disclosed herein without departing from the scope of the invention as defined in the following claims.

What is claimed is:

1. A recirculating fryer assembly comprising:
   a fryer vat for holding cooking fluid and receiving food articles for cooking, including an inlet port and an outlet port;
   a heating element disposed within the vat, or within a recirculation path of the cooking fluid, for heating the cooking fluid used in the fryer;
   a frame supporting the fryer vat; and
   a filtration system including:
      a pump having an inlet port and an outlet port, the pump outlet port coupled to the fryer vat inlet so as to pump cooking fluid into the fryer vat;
      a continuous filter assembly, including a continuous filter housing, an inlet into the continuous filter housing, an outlet from the continuous filter housing, and a first filter positioned, within the continuous filter housing, operatively between the continuous filter housing inlet and the continuous filter housing outlet;
      a batch filter assembly, including a holding tank, an inlet into the holding tank, an outlet from the holding tank and a second filter positioned within the holding tank, operatively between the holding tank inlet and the holding tank outlet;
      a valve having a first inlet in fluid communication with the continuous filter housing outlet, a second inlet in fluid communication with the holding tank outlet, and an outlet in fluid communication with the pump inlet, the valve including a switch operative to control flow of cooking fluid therethrough from a first position in which the first valve inlet is in fluid communication with the continuous filter housing outlet to a second position in which the second valve inlet is in fluid communication with the holding tank outlet.

2. The recirculating fryer assembly of claim 1, wherein the holding tank of the batch filter assembly is sized to hold substantially the entire contents of the fryer vat.

3. The recirculating fryer assembly of claim 2, wherein:
   the continuous filter housing holds substantially less than the entire contents of the fryer vat;

the continuous filter housing is removably seated within the holding tank of the batch filter and the inlet to the continuous filter housing is in fluid communication with the outlet port of the fryer vat during normal operation of the recirculating fryer; and the valve is in the first position during the normal operation of the recirculating fryer so that the filtration system pumps cooking fluid from the fryer vat, through the continuous filter housing and first filter, through the valve, through the pump and back into the fryer vat.

4. The recirculating fryer of claim 3, wherein:

the continuous filter assembly is removably coupled to the inlet port of the pump by a quick-disconnect type connection;

the holding tank includes an opening to receive the entire contents of the fryer vat from the outlet port of the fryer when the inlet into the continuous filter housing is uncoupled from the flyer vat and the continuous filter housing is removed from the holding tank of the batch filter.

5. The recirculating fryer of claim 4, wherein the pump, continuous filter assembly, batch filter assembly, and valve comprise a separate self-contained unit.

6. The recirculating fryer of claim 5, further comprising wheels attached to said self-contained unit to provide mobility of the unit.

7. The recirculating fryer of claim 6, wherein:

the frame encloses an entrance port into which the self-contained unit may be wheeled into and out from; and the fryer vat is supported by the frame substantially above the entrance port.

8. The recirculating fryer of claim 6, wherein the pump is adapted to periodically reverse the flow.

9. A method for filtering the cooking fluid of a recirculating fryer assembly, the recirculating fryer including a fryer vat having an outlet and an inlet, and a pump for recirculating cooking fluid from the vat outlet to the vat inlet, the method comprising:

providing a continuous filter having an inlet port and an outlet port, a batch filter having a holding tank, an opening into the holding tank and an outlet from the holding tank, and a valve having a first inlet in fluid communication with the outlet port of the continuous filter, a second inlet in fluid communication with the outlet from the holding tank of the batch filter and an outlet in fluid communication with an inlet to the pump, the valve including a switch operative to control the flow of the cooking fluid therethrough from a first position in which the first valve inlet is in fluid communication with the valve outlet to a second position in which the second valve inlet is in fluid communication with the valve outlet;

coupling the inlet port of the continuous filter to the outlet of the fryer vat;

switching the valve to the first position; and activating the pump to pump the cooking fluid from the fryer vat, through the continuous filter, through the valve, through the pump and back into the fryer vat.

10. The method of claim 9, further comprising the steps of:

decoupling the inlet port of the continuous filter from the outlet of the fryer vat;

draining the cooking fluid from the fryer vat into the holding tank of the batch filter;

switching the valve to the second position; and activating the pump to pump the cooking fluid from the batch filter, though the pump and back into the vat.

11. The method of claim 10, further comprising the steps of:

removably seating the continuous filter within the holding tank of the batch filter during the step of actuating the pump to pump cooking fluid from the fryer vat, through the continuous filter, through the valve, through the pump and back into the fryer; and removing the continuous filter from the holding tank of the batch filter prior to the step of activating the pump to pump the cooking fluid from the batch filter, though the pump and back into the vat.

12. The method of claim 9, further comprising the step of removably seating the continuous filter within the holding tank of the batch filter.

13. The method of claim 9, further comprising the step of periodically reversing the flow through the pump.

* * * * *

UNITED STATES PATENT AND TRADEMARK OFFICE
CERTIFICATE OF CORRECTION

PATENT NO. : 6,235,210 B1
DATED : May 22, 2001
INVENTOR(S) : Atul Saksena

Page 1 of 1

It is certified that error appears in the above-identified patent and that said Letters Patent is hereby corrected as shown below:

<u>Claim 4, column 7,</u>
Line 18, the word "flyer" should be -- fryer --.

Signed and Sealed this

Thirtieth Day of October, 2001

Attest:

*Nicholas P. Godici*

NICHOLAS P. GODICI
*Attesting Officer*  *Acting Director of the United States Patent and Trademark Office*